(12) United States Patent
Heider et al.

(10) Patent No.: US 8,220,874 B2
(45) Date of Patent: *Jul. 17, 2012

(54) DUMP DEVICE FOR SIDE DUMP TRAILER (75) Inventors: Dale J. Heider, Humboldt, IA (US); Leon J. Heider, Humboldt, IA (US)

(73) Assignee: Jet Co., Humboldt, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,038

(22) Filed: Jul. 15, 2011

(65) Prior Publication Data

US 2011/0272996 A1 Nov. 10, 2011

Related U.S. Application Data (63) Continuation of application No. 12/131,575, filed on Jun. 2, 2008, now Pat. No. 7,992,942.

(51) Int. Cl.
*B65G 67/42* (2006.01)

(52) U.S. Cl. ............ 298/17.6; 298/17.7; 298/18

(58) Field of Classification Search .......... 298/18, 298/17.5, 17.6, 17.7; 296/98; B65G 67/42
See application file for complete search history.

(56) References Cited

U.S. PATENT DOCUMENTS

| | | | |
|---|---|---|---|
| 2,072,998 A | 3/1937 | Allin | |
| 4,494,798 A | 1/1985 | Bailey | |
| 4,619,484 A | 10/1986 | Maxey | |
| 5,265,940 A | 11/1993 | Ostermeyer | |
| 5,480,214 A | 1/1996 | Rogers | |
| 5,580,211 A * | 12/1996 | Mengel | 414/812 |
| 6,113,194 A | 9/2000 | Neufeld | |
| 6,142,554 A * | 11/2000 | Carroll et al. | 296/100.12 |
| 6,488,340 B2 | 12/2002 | Jensen | |
| 6,520,589 B2 | 2/2003 | Jensen et al. | |
| 6,554,367 B2 | 4/2003 | Jensen | |
| 7,032,950 B2 | 4/2006 | Eggers et al. | |
| 7,111,907 B2 * | 9/2006 | Boon | 298/18 |
| 7,377,592 B2 | 5/2008 | Kraenzle | |
| 7,611,187 B1 * | 11/2009 | Rogers | 296/98 |

FOREIGN PATENT DOCUMENTS

CA 2058661 3/1992

OTHER PUBLICATIONS

Printout from Truck Paper webpage: "2007 Const TRLR Spec Frameless Rock Trailer w/ Barn Door" [retrieved on Sep. 2, 2011 from the Internet: http://www.truckpaper.com/listingsdetail/detail.aspx?OHID=1838892&], 2 pages.
Rock Master Flier from Construction Trailer Specialists, Inc., Sikeston, Missouri, 1 page, Sep. 2, 2011.

* cited by examiner

*Primary Examiner* — Glenn Dayoan
*Assistant Examiner* — Sunsurraye Westbrook
(74) *Attorney, Agent, or Firm* — McKee, Voorhees & Sease, P.L.C.

(57) ABSTRACT

The tub is mounted to a frame for alternative movement from a position wherein the tub is centrally located with respect to the longitudinal axis of the frame. The tub may be tilted from a position centrally located to a side dump position which is offset with respect to the longitudinal axis of the frame. The apparatus for moving the tub from its centrally located position to its side dump position is a barrel pivotally mounted to the tub and an extension rod which is pivotally mounted to the frame.

15 Claims, 7 Drawing Sheets

DUMP DEVICE FOR SIDE DUMP TRAILER

CROSS-REFERENCE TO RELATED APPLICATIONS

This application is a Continuation application of U.S. Ser. No. 12/131,575 filed Jun. 2, 2008, herein incorporated by reference in its entirety.

BACKGROUND OF THE INVENTION

This invention relates to a dump device for a side dump trailer.

Figure 4:
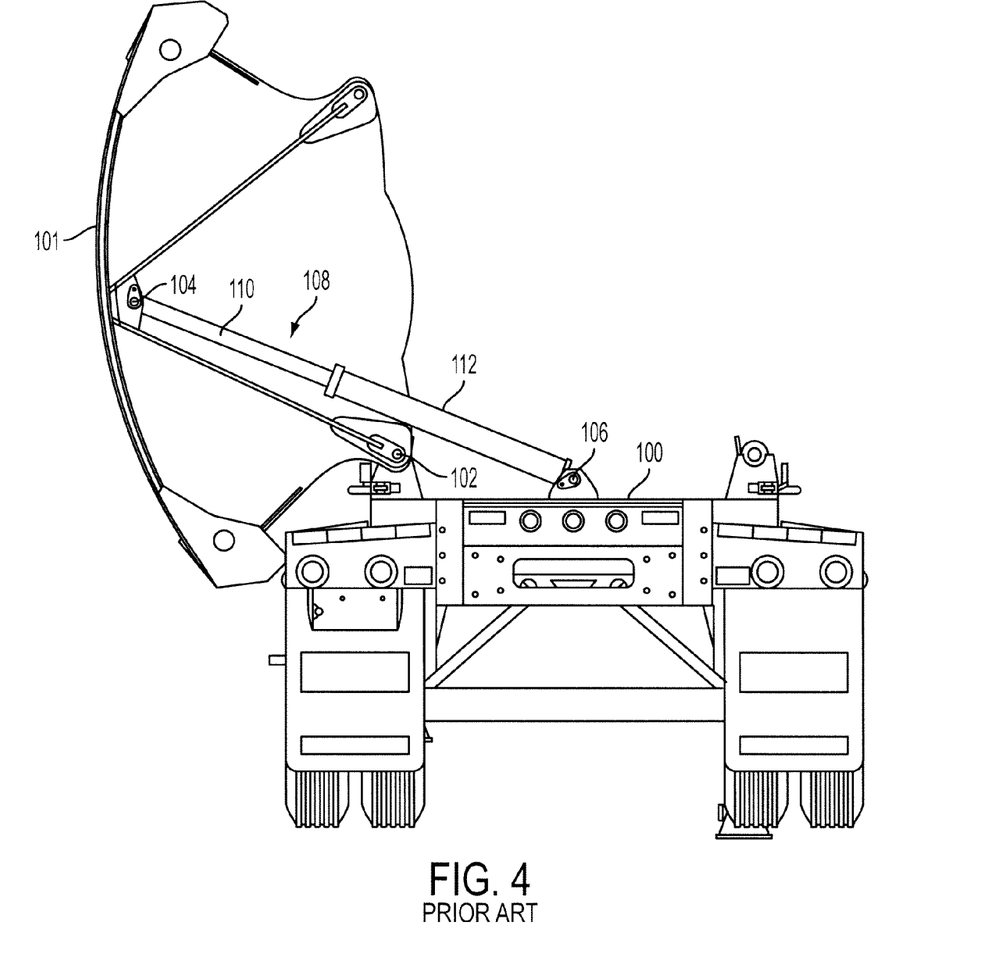
FIG. 4 is a prior art device.

Referring to FIG. 4, a prior art side dump trailer is shown. The side dump trailer includes a frame 100 which has a tub 101 pivotally attached thereto. A pivot of tub 101 to the frame 100 is provided at 102. A hydraulic assembly 108 includes rod 110 and a barrel 112. A pivot point 104 is provided between the rod 110 and the tub 101. A pivot point 106 is provided between the barrel 112 and the frame 100.

Of particular importance is the arrangement of the hydraulic assembly 108. The barrel 112 is attached to the frame at 106. The rod 110 is attached to the tub 101 at pivot point 104. The extension of the entire hydraulic assembly 108 is at a distance between 106, 104. Consequently, the geometry results in an increase in velocity and acceleration of the tub 101 from its centered position on frame 100 to its side dump position shown in FIG. 4. Furthermore, the hydraulic assembly 108 forms an angle with respect to 102, 104, 106 that closely approaches parallel to 102, 104. The result is sometimes tilting of the frame 100, in response to the extension of the barrel 112 and the rod 110 to the side dump position as shown in FIG. 4. This sometimes results in the tipping over of the frame 100.

Therefore, an object of the present invention is the provision of an improved dump device for a side dump trailer.

A further object of the present invention is the provision of a dump device which minimizes the velocity and acceleration of the dumping of tub relative to the frame of the vehicle.

A further object of the present invention is the provision of a dump device wherein the hydraulic assembly moves a lesser distance than the pivot points at the opposite ends of the hydraulic assembly.

A further object of the present invention is the provision of a tub which moves at a substantial decrease in velocity and acceleration relative to the frame as it moves from the upstanding position toward the side dump position.

Another object of the present invention is the provision of a tilt device which has a hydraulic assembly extending at an angel of 35° plus or minus 10° with respect to pivots 102, 104.

A further object of the present invention is the provision of a device which reverses the barrel and the rod so that the barrel is attached to the tub and the rod is attached to the frame.

A further object of the present invention is the provision of a dump device for a side dump trailer which utilizes a pivotal attachment between the tub and the barrel within the first one-half of the barrel.

A further object of the present invention is a hydraulic assembly which has a barrel that is directly pivoted to the tub so that it pivots with the tub from its upstanding position to its side dump position.

Another object of the present invention is the provision of a device which is economical, durable in use, and efficient in operation.

BRIEF SUMMARY OF THE INVENTION

The foregoing objects may be achieved by a side dump trailer having an elongated frame that includes a longitudinal axis. A tub having an open top, first and second ends, first and second opposite sides, is provided and is pivotally connected to a frame for pivotal movement from an upstanding position wherein the top is upwardly presented and is centrally located with respect to the longitudinal axis of the frame to a side dump position wherein the tub is offset with respect to the longitudinal axis of the frame for dumping. The first hydraulic assembly is mounted to one of the first and second opposite ends of the side dump trailer. The hydraulic assembly has a barrel pivotally fixed to the tub and having a rod at least partially within the barrel and pivotally fixed to the frame. The barrel and the rod are extensible with respect to one another between a retracted position wherein the tub is in the upstanding position and in an extended position wherein the tub is in the side dump position.

According to another feature of the present invention, a second hydraulic assembly identical to the first hydraulic assembly is mounted to the other of the first and second opposite ends.

According to another feature of the present invention, the barrel has first and second ends. The rod is telescopically inserted within the second end of the barrel and the pivotal connection between the barrel is adjacent the second end of the barrel and located away from the first end of the barrel.

According to another feature of the present invention, the barrel pivots about the pivotal connection of the barrel to the tub between an upstanding position of the tub to the side dump position of the tub.

According to another feature of the present invention, the barrel has first and second opposite ends. The second end has the rod telescopically inserted therein for telescopic movement therein. The barrel is pivotally connected to the tub between the second end and one-half of the length of the barrel.

The foregoing objects may be achieved by the method of the present invention by mounting the pivotal movement of an elongated frame having a longitudinal axis to a tub. The tub includes an open top, a first end, a second end, a first side, and an opposite second side. The tub is pivoted with respect to the frame from an upstanding position wherein the top is upwardly presented and is in a central location with respect to the longitudinal axis of the frame to a side dump position wherein the tub is longitudinally offset with respect to the longitudinal axis of the frame for dumping. The method includes making a first pivotal connection between the barrel and the tub and making a second pivotal connection between a rod and the frame. The telescoping of the rod is accomplished within the barrel from a retracted position wherein the tub is in the upstanding position to an extended position wherein the tub is in side dump position.

DETAILED DESCRIPTION OF THE PREFERRED EMBODIMENT

Figure 1:
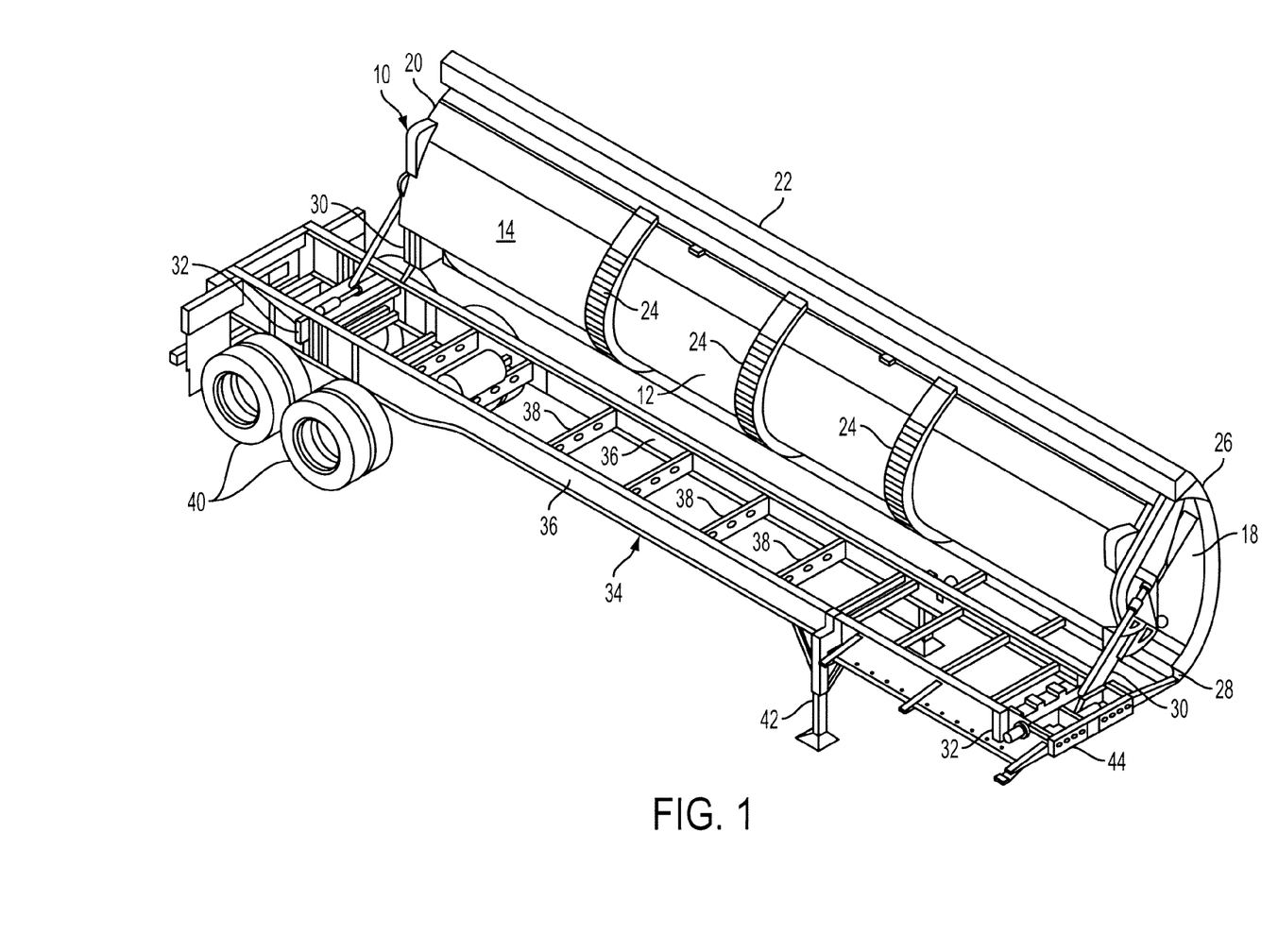
FIG. 1 is a perspective view of the present invention.

A tub 10 includes a curved bottom wall 12 including a V-shaped side wall 14 and a V-shaped side wall 16. The end walls 18, 20 enclose an open top 22. Reinforcing members 24 extend around the outer surface of curved wall 12 and V-shaped walls 14, 16. A side rail 26 is provided at the upper edge of V-shaped wall 14 and a side rail 28 is shown at the upper end of V-shaped side wall 16. The structure of the tub 10 may vary and the walls 14, 16 may have a flat bottom instead of a curved wall 12.

A frame 34 is provided with two longitudinal members 36 and with a plurality of cross members 38 mounted thereon. A front and rear pivot point 30 is provided adjacent one of the sides of the frame 34 and an alternative pivot point 32 is provided adjacent the opposite side of member 36.

Figure 2:
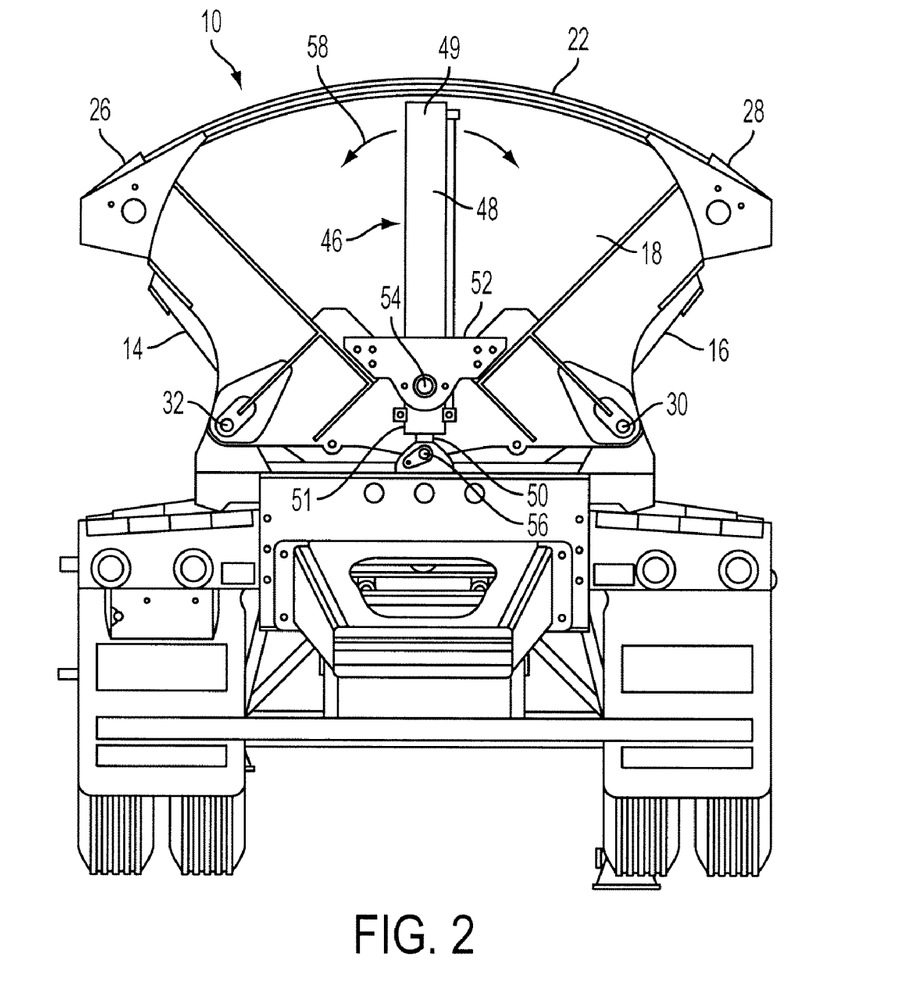
FIG. 2 is a rear elevational view of the present invention in an upstanding position.
Figure 3:
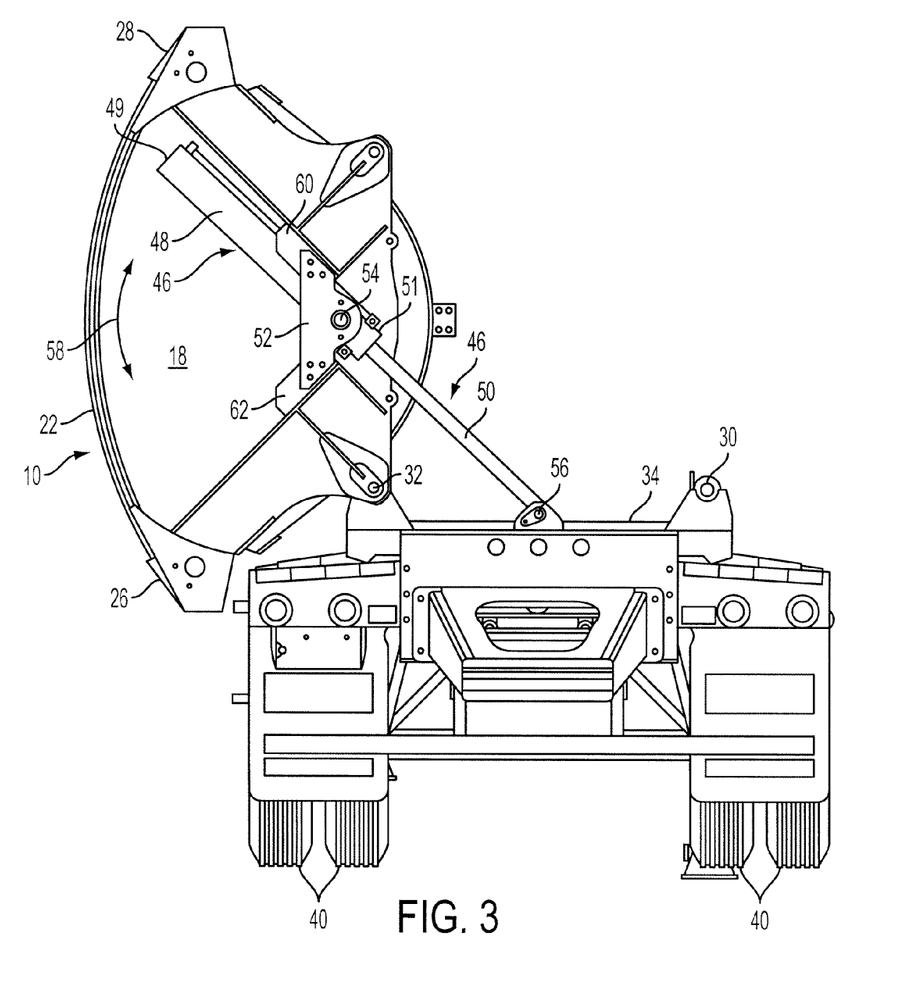
FIG. 3 is a rear elevational view showing the hydraulic cylinder in the extended position and the side dump trailer in a side dump position.

The pivot points 30, 32 are shown in FIG. 2 and are alternatively positioned so that the tub 10 may be pivoted as shown in FIG. 3, or alternatively, may be pivoted about member 30 in the opposite direction from that shown in FIG. 3. The mechanism for pivot points 30, 32, are conventional in structure, and may include a mechanical pin, an electrical pin or other device for holding the side dump trailer while the other pivot point 30, 32 provide the pivoting of the side dump trailer. In this way, the member hinge pivot point 32 may be utilized, or in the alternative, the member 30 may be utilized with the member 32 being disconnected.

Rear tandems 40 are provided adjacent the rear end of the frame member 34, and front stands 42 may be provided at the opposite end from rear tandems 40. While tandem wheels 40 are shown, the present invention may have any number of wheels. A fifth wheel 44 is partially shown for mounting the trailer to a tractor (not shown).

A hydraulic assembly 46 includes a barrel 48 having a first end 49 and a second end 51.

The barrel 48 is shown pivoted to the tub 10 at a pivot point 54 on a cross frame 52 which is mounted on the tub 10. The rod 50 is telescopically mounted within the second end 51 of barrel 48 and is pivoted at point 56 to frame 34. The pivotal mount 54 of the barrel 48 to the tub 10 is accomplished between second end 51 and the center point of the barrel 48. Preferably the pivot point 54 is attached adjacent the second end 51. This results in the barrel 48 pivoting from the position shown in FIG. 2 which is substantially vertically disposed either to the left or the right as indicated by arrow 58. As shown in FIG. 2, the vertically oriented position of the barrel 48 pivots about 54 from the position shown in FIG. 2 to the position shown in FIG. 3.

Figure 3A:
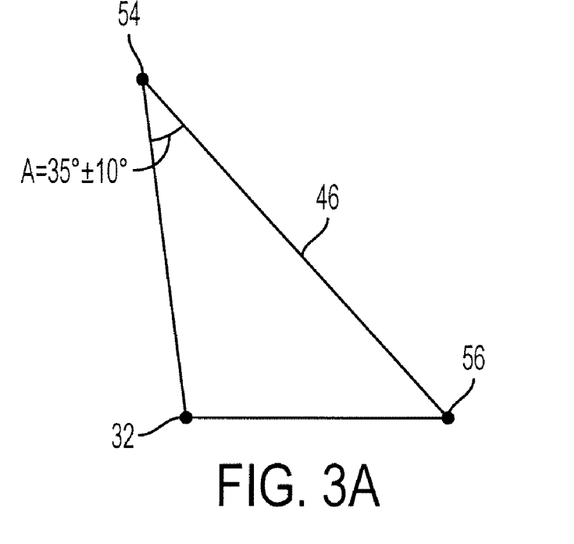
FIG. 3A is a schematic view showing the relationship of pivot geometry when the tub is pivoted with respect to the frame about pivot 32.
Figure 3B:
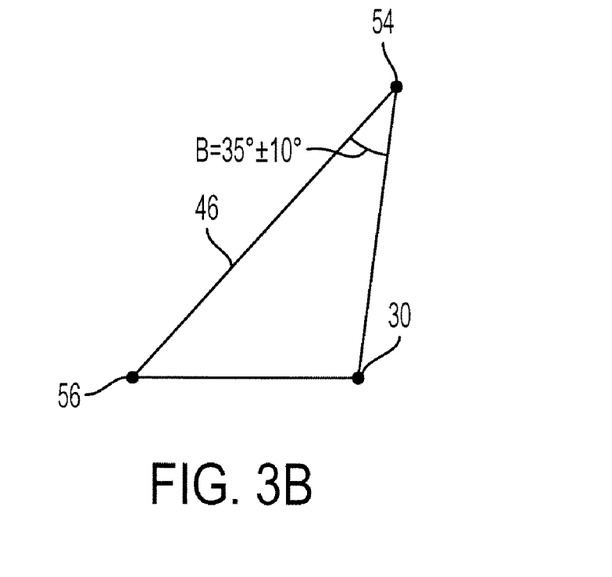
FIG. 3B is a schematic view showing the relationship of the pivot geometry when the tub is pivoted with respect to the frame about pivot 30.

However, the device may be utilized to tilt about pivot axis 30 and consequently the direction of pivoting of barrel 48 is to the left, as shown in FIG. 3B. FIG. 3A shows the relative positions of members 46, 54, 56, 32 and angle A. Alternatively, FIG. 3B shows the relative positions of members 46, 54, 56, 30 and angle A.

As can be seen by a comparison of FIG. 4 and FIG. 3, the prior art hydraulic assembly 108 forms a position nearly parallel, but not quite parallel, with respect to the pivot point 102. Whereas the hydraulic assembly 46 is shown in FIG. 3 to form an angle of approximately 35° (plus or minus approximately) 10° with respect to the side dump position. Furthermore, the prior art hydraulic assembly 108 (both the barrel 112 and the rod 110) extends outwardly a substantially greater distance between pivot points 104, 106 than the hydraulic assembly 46 of FIG. 3 extends between pivot points 54, 56. This is because the pivot point 54 is attached between longitudinal center point and the second end 51 of the cylinder 48.

A wing member 60 and the end wall 18 are provided for nesting the barrel 48 as shown in FIG. 3, and a similar wing member 62 and the end wall 18 are provided for nesting the barrel 48 when the pivot point 30 is utilized. The same is true for the other end of the tub 10.

Figure 5:
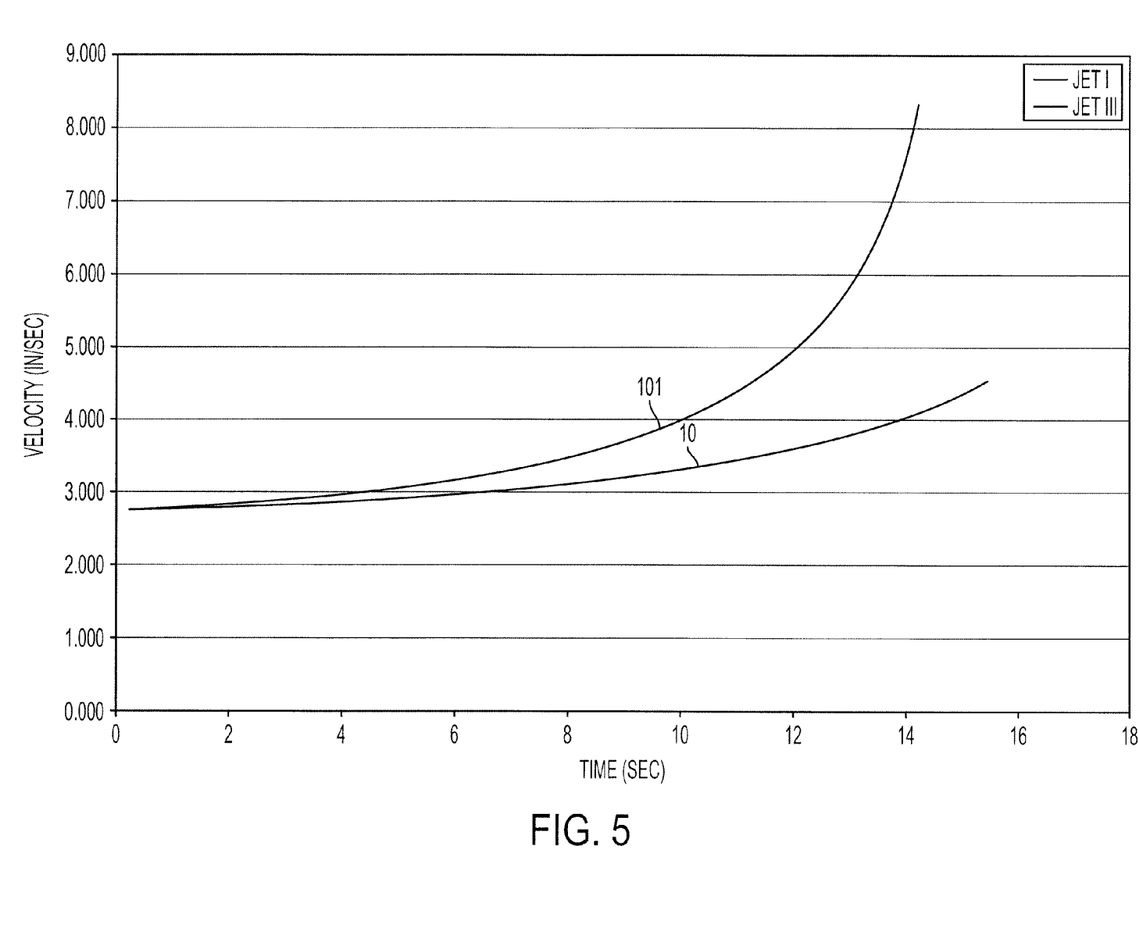
FIG. 5 is a chart showing the comparative velocities of the prior art and the present invention.
Figure 6:
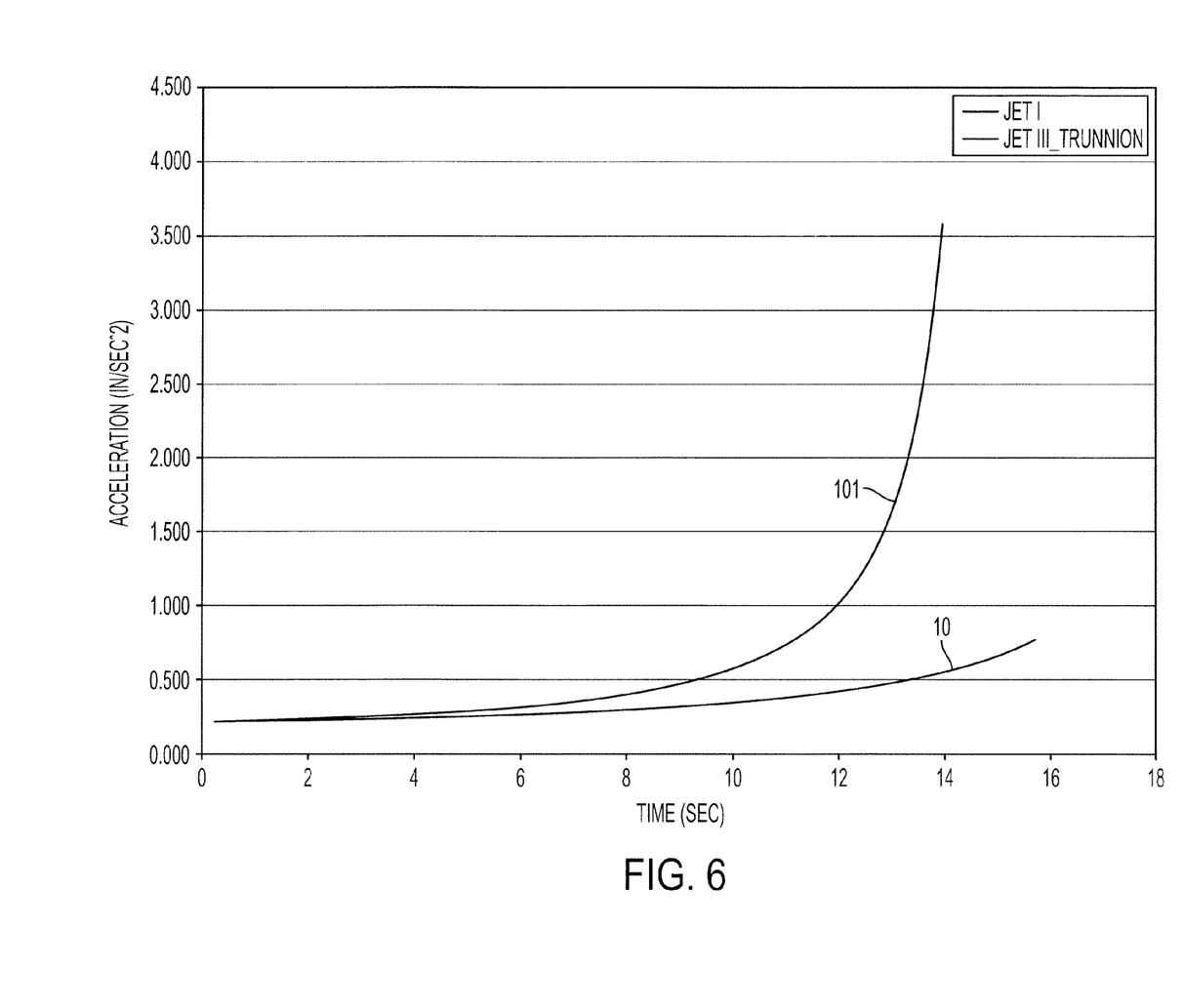
FIG. 6 is a chart showing the comparative acceleration of the prior art and the present invention.

Furthermore, as shown in FIG. 5, the velocity of the center of gravity of tub 101 increases at the end of the stroke of hydraulic assembly 108 whereas the velocity of center of gravity of tub 10 remains more constant and lower. Similarly FIG. 6 shows that the acceleration of the center of gravity of the tub 101 increases at the end of the stroke toward the side dump position whereas the acceleration of the center of gravity of tub 10 remains more constant and lower. Both the velocity of the center of gravity of the tub 101 increases to 8.0 in/sec and the acceleration increases to over 3.5 in/sec$^2$, whereas the velocity of the center of gravity of tub 10 increases only to 4.5 in/sec and the acceleration increases to only 0.75 in/sec$^2$. The charts of FIGS. 5 and 6 utilize cylinders of the same size and pumps having the same capacity.

The present invention provides substantial results which are not achieved by the prior art device. The result is that there is less tilting action of the frame 34 due to the reduced velocity (FIG. 5) and acceleration (FIG. 6). In contrast, the hydraulic assembly 108, because of increased velocity and acceleration, results sometimes in the tilting action of the frame 100 as shown in FIG. 4. Sometimes it tips over. The hydraulic assembly 46 forms an angle of 35° plus or minus 10° with respect to both FIGS. 3A and 3B. The tilting action of cylinder 46 is about the pivot axis 54 in a clockwise direction as viewed in FIG. 3A and in a counter clockwise direction as viewed in FIG. 3B.

As an alternative to the present invention, the hydraulic assembly 46 can be reversed with barrel 48 attached pivotally to the frame 34 at 56 and with the rod 50 pivotally connected to the tub 10. In that situation, the first end 49 of barrel 48 would be below frame 34, and the second end 51 of barrel 48 would be adjacent the pivotal connection 56 to frame 34. This second alternative is less desirable because the barrel 48 would be below frame 34 and would necessarily pivot about pivotal connection 56. This would be cumbersome because the pivoting of barrel 48 about connection 56 would require considerable space which normally would be taken up by the structure below frame 34.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A side dump trailer, comprising:
an elongated wheel frame having a longitudinal axis;
a tub having an open top and first and second ends, the tub being pivotally mounted to the frame for pivotal movement from an upstanding position wherein the top is upwardly presented and the tub is centrally located with respect to the longitudinal axis of the frame to a side dump position wherein the top is tilted and the tub is offset with respect to the longitudinal axis of the frame for dumping; and a first hydraulic assembly having a barrel pivotally connected to a lower portion of the tub at a barrel pivot point, and having a rod with a first end at least partially within the barrel and a second end pivotally connected to the frame at a rod pivot point;

the barrel and the rod being extensible with respect to one another between a retracted position wherein the tub is in the upstanding position and an extended position wherein the tub is in the side dump position.

2. The side dump trailer of claim 1, wherein the first hydraulic assembly is mounted at the first end of the tub.

3. The side dump trailer of claim 2 wherein a second hydraulic assembly is mounted at the second end of the tub.

4. The side dump trailer of claim 1 wherein the barrel has first and second ends, the rod being telescopically inserted within the second end of the barrel, the barrel pivot point being adjacent the second end of the barrel and being located away from the first end of the barrel.

5. The side dump trailer of claim 1, wherein the barrel has first and second ends, the rod being telescopically inserted within the second end of the barrel; wherein the barrel pivot point is nearer to the second end of the barrel than to the first end of the barrel.

6. The side dump trailer of claim 1, wherein the barrel has first and second opposite ends, the second end having the rod telescopically inserted therein for telescopic movement therein; and the barrel pivot point is located between the second end and one half of the length of the barrel.

7. A side dump trailer, comprising:
an elongated wheel frame having a left side and a right side;
an elongated tub having an open top, the tub being connected to the frame for movement between an upstanding position wherein the open top is generally upwardly presented to retain material within the tub, and a dump position wherein the tub is tilted to dump material from the tub to one of the right side or the left side of the wheel frame; and
a hydraulic assembly pivotally connected to the frame at a frame pivot point and pivotally connected to the tub at a tub pivot point, the hydraulic assembly being extensible to move the tub between the upstanding position and the dump position, and wherein when the tub is in the upstanding position, a distance between the tub pivot point and the frame pivot point is less than one half of a length of the hydraulic assembly.

8. The side dump trailer of claim 7, wherein the hydraulic assembly comprises a barrel and a rod, the rod having a first end at least partially within the barrel and a second end opposite from the first end; the barrel being pivotally connected to the tub at the tub pivot point and the rod being pivotally connected to the frame at the frame pivot point.

9. The side dump trailer of claim 8, wherein the barrel has first and second ends, the rod being telescopically inserted within the second end of the barrel, the tub pivot point being adjacent the second end of the barrel and being located away from the first end of the barrel.

10. The side dump trailer of claim 8, wherein the barrel has first and second opposite ends, the second end having the rod telescopically inserted therein for telescopic movement therein; and the barrel pivot point is located between the second end and one half of the length of the barrel.

11. A side dump trailer, comprising:
an elongated wheel frame having a left side and a right side;
a tub having an open top, the tub being connected to the frame for movement between an upstanding position wherein the open top is generally upwardly presented to retain material within the tub, and a dump position wherein the tub is tilted to dump material from the tub to one of the right side or the left side of the wheel frame; and
a hydraulic assembly having a barrel pivotally connected to the tub at a barrel pivot point, and having a rod with a first end at least partially within the barrel and a second end pivotally connected to the frame at a rod pivot point, the barrel and the rod being extensible with respect to one another to move the tub from the upstanding position to the dump position.

12. The side dump trailer of claim 11, wherein the barrel pivot point is located at a lower portion of the tub.

13. The side dump trailer of claim 11, wherein the barrel has first and second ends, the rod being telescopically inserted within the second end of the barrel, the barrel pivot point being adjacent the second end of the barrel and being located away from the first end of the barrel.

14. The side dump trailer of claim 11, wherein the barrel has first and second ends, the rod being telescopically inserted within the second end of the barrel; wherein the barrel pivot point is nearer to the second end of the barrel than to the first end of the barrel.

15. The side dump trailer of claim 11, wherein the barrel has first and second opposite ends, the second end having the rod telescopically inserted therein for telescopic movement therein; and the barrel pivot point is located between the second end and one half of the length of the barrel.

* * * * *